(12) United States Patent
Brabender

(10) Patent No.: US 9,715,387 B2
(45) Date of Patent: Jul. 25, 2017

(54) CONFIGURABLE EVENT SELECTION FOR MICROCONTROLLER TIMER/COUNTER UNIT CONTROL

(71) Applicant: Renesas Electronics America Inc., Santa Clara, CA (US)

(72) Inventor: Jon Matthew Brabender, Cary, NC (US)

(73) Assignee: Renesas Electronics America Inc., Santa Clara, CA (US)

( * ) Notice: Subject to any disclaimer, the term of this patent is extended or adjusted under 35 U.S.C. 154(b) by 76 days.

(21) Appl. No.: 14/732,044

(22) Filed: Jun. 5, 2015

(65) Prior Publication Data
US 2016/0357562 A1 Dec. 8, 2016

(51) Int. Cl.
*G06F 9/30* (2006.01)
*G06F 9/54* (2006.01)

(52) U.S. Cl.
CPC ...... *G06F 9/30087* (2013.01); *G06F 9/30145* (2013.01); *G06F 9/542* (2013.01)

(58) Field of Classification Search
CPC .......... G06F 1/04; G06F 1/14; G06F 9/30087; G06F 9/30145; G06F 9/542
USPC ................................. 713/500, 502
See application file for complete search history.

(56) References Cited

U.S. PATENT DOCUMENTS

| | | | | |
|---|---|---|---|---|
| 4,942,559 A * | 7/1990 | Fleck | ..................... | G04G 15/00 368/113 |
| 5,577,235 A * | 11/1996 | Mitra | .................. | G06F 15/7814 713/600 |
| 7,362,794 B2 * | 4/2008 | Ma | ....................... | H04B 1/7103 375/148 |
| 7,725,758 B2 * | 5/2010 | Link | ........................ | G06F 1/14 368/108 |
| 2013/0080819 A1 * | 3/2013 | Bowling | ................... | G06F 1/14 713/502 |
| 2014/0040654 A1 * | 2/2014 | Bowling | ................... | G06F 1/04 713/600 |

* cited by examiner

*Primary Examiner* — Chun Cao
(74) *Attorney, Agent, or Firm* — Campbell Stephenson LLP

(57) ABSTRACT

An apparatus and method for dynamically controlling functional aspects of an MCU. In one embodiment an MCU includes a central processing unit (CPU), a memory for storing instructions executable by the CPU, and a T/C channel coupled to receive control values generated by CPU and M event signals, wherein M is an integer greater than 1. The T/C channel is configured to select one or more of the M event signals based on the one or more of the control values. The T/C channel is configured to generate a control signal as a function of the selected one or more of the M event signals. A function of the T/C channel can be controlled by the control signal.

20 Claims, 6 Drawing Sheets

CONFIGURABLE EVENT SELECTION FOR MICROCONTROLLER TIMER/COUNTER UNIT CONTROL

BACKGROUND OF THE INVENTION

Microcontrollers units (MCUs) are small computers formed on integrated circuits. MCUs provide embedded control of a wide range of devices, such as office machines, appliances, automobile engine control systems, implantable medical devices, power tools, toys, etc.

MCUs include a central processing unit (CPU) and memory. The CPU executes a program (hereinafter referred to as an embedded program) stored in memory. MCUs also include other components such as analog-to-digital converters (ADCs), digital-to-analog converters (DACs), comparators, timer/counter (T/C) units, etc., many of which are configurable by the CPU. These components cooperate with the CPU to improve overall MCU performance.

SUMMARY OF THE INVENTION

An apparatus and method for dynamically controlling functional aspects of an MCU. In one embodiment an MCU includes a central processing unit (CPU), a memory for storing instructions executable by the CPU, and a T/C channel coupled to receive M event signals, where M is an integer greater than 1. The T/C channel is configured to select one or more of the M event signals based on one or more control values generated by CPU.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

Figure 1:
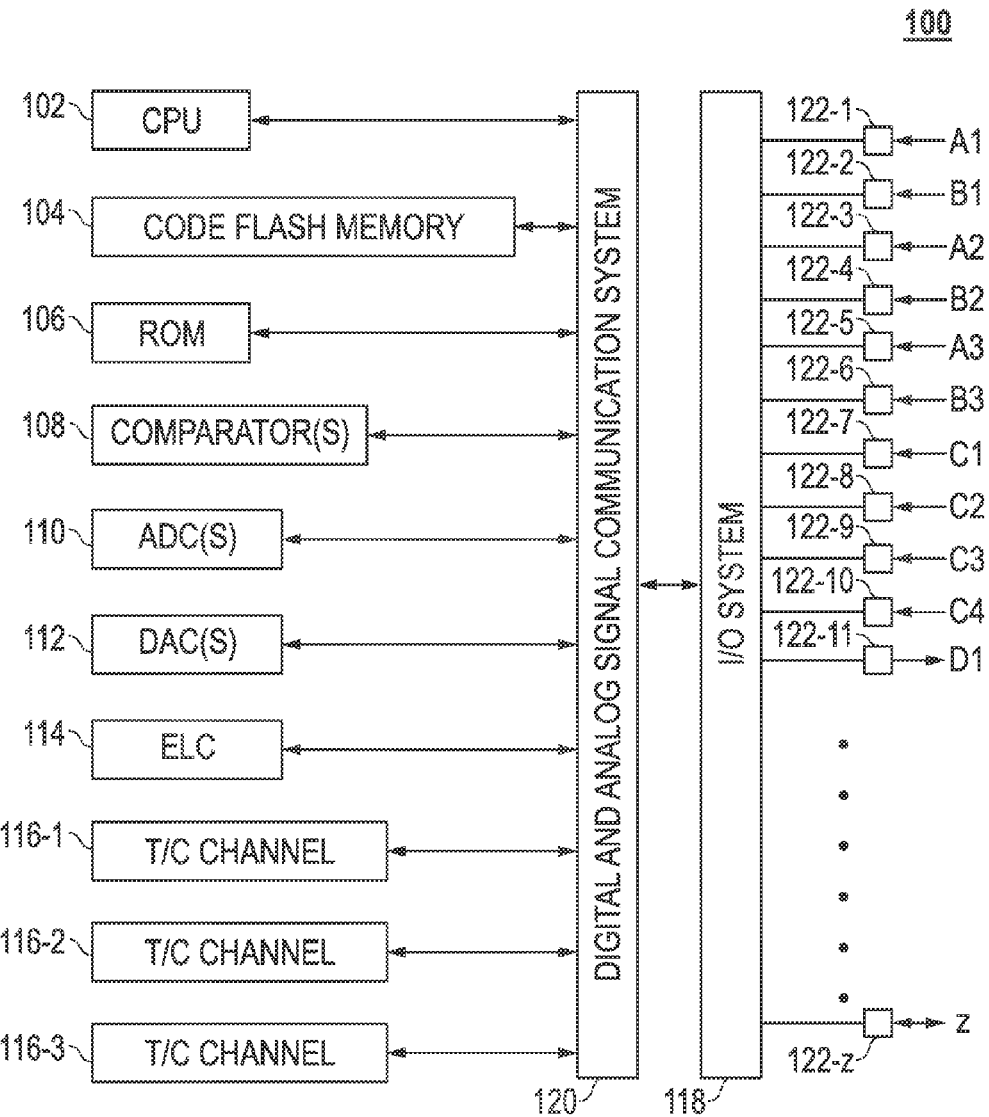
FIG. 1 is a block diagram illustrating an example MCU.

MCUs include configurable T/C units and a CPU. T/C units include at least one n-bit counter register (hereinafter counter register) that stores an n-bit counter value (hereinafter counter value). Depending on how a T/C unit is configured by the CPU, the counter register can count pulses of a clock signal (making the T/C unit a timer) or pulses of an event signal (making the T/C unit a counter). In other words, the counter register will increment or decrement its counter value with each pulse of a clock signal or each pulse of an event signal. The present invention will be described primarily with reference to a T/C unit incrementing its counter value except where noted.

Clock pulses are produced by a clock generator that is internal or external to the MCU. In contrast to clock pulses, event pulses may be randomly generated. Event pulses can be generated for corresponding events by devices that are internal or external to the MCU. For example, a comparator internal to the MCU may generate an event pulse when the comparator detects equality between two input values. Or, an MCU may receive an event pulse from an external magnetic sensor when the sensor detects a magnetic field of certain strength. For purposes of definition only, a pulse is the transition of a signal from a first state (e.g., 0 volts) to a second state (e.g., 5 volts). The signal should hold the second state for a short period of time before returning back to the first state (e.g., low or 0 volts). The short period of time should be longer than that associated with a transition caused by noise.

Counting clock or event pulses is a key function of T/C units. A typical T/C unit will not count pulses, however, until it receives a start signal. Moreover, the T/C unit will continue to count pulses until it receives a stop signal. Additionally, the T/C unit will clear its counter value to a predetermined value in response to receiving a clear signal.

Capturing a count value is another T/C unit function. T/C units include one or more capture registers. When a T/C unit receives a capture signal, the T/C unit copies its' counter value to a capture register. When the counter value is captured, the T/C unit may generate an event pulse at an output. The event pulse can be transmitted to the CPU or to other components of the MCU.

A T/C unit can compare its count value to a predetermined value. T/C units include one or more compare registers (sometimes also called match registers). Compare registers store values generated by the CPU. The T/C unit can continuously compare its counter value with a value in a compare register. When the values compare equally, the T/C unit typically generates an event pulse to that effect. The foregoing illustrates some functions that can be implemented by T/C units. Other T/C unit functions are contemplated.

A CPU can directly control a T/C unit. For example, a CPU can generate and transmit a signal to capture a count value. When the T/C unit receives the CPU signal, the T/C unit copies its counter value to a capture register. Alternatively, a T/C unit can operate autonomously once configured by the CPU. During autonomous operation, T/C units respond to event signals received at T/C unit ports. For example, a T/C unit can be configured by a CPU to start counting when the T/C unit receives an event pulse at a start port, and the T/C unit can be configured by a CPU to stop counting when the T/C unit receives an event pulse at a stop port. A T/C unit can be configured by a CPU to clear its counter value when the T/C unit receives an event pulse at a clear port. Further, a T/C unit may be configured by a CPU to capture its counter value when the T/C unit receives an event pulse at a capture port. Other T/C unit functions can be controlled in similar fashion. This alternative method of control allows T/C units to function autonomously, which can improve overall performance of MCUs. More particularly, configuring T/C units to respond to event pulses rather than CPU control signals, frees the CPU to perform duties other than generating control signals for the T/C unit.

The present invention generally relates to an apparatus and method for dynamically controlling functions of one or more MCU components such as T/C units. The present will be described with reference to an apparatus and method for dynamically controlling functions of T/C units, it being understood the present invention should not be limited thereto. In one embodiment, a CPU executing an embedded program can generate control values that determine how one or more functions of a T/C unit are controlled during run time. The control of a T/C unit function can also be changed during run time with a new control value generated by the CPU. FIG. 1 shows an example MCU 100 employing one embodiment of the present invention. While the present invention will be described with reference to MCU 100, neither the present invention nor the term MCU should be limited to that shown in the figures.

Several components of MCU 100 are shown in FIG. 1. For example, MCU 100 includes a CPU 102 that contains an arithmetic logic unit (not shown), which performs arithmetic and logical operations, and a control unit (not shown), which extracts instructions from an embedded program stored in flash memory 104, calling on the arithmetic logic unit when necessary. Although not shown in the figures, a computer system can transmit the embedded program to MCU 100, which takes form in executable instructions, via a communication link such as a wide area network. As will be more fully described, CPU 102 executes the embedded program and, in response, generates control values for controlling functional aspects of components. MCU 100 also includes a small amount of RAM 106 that is used by CPU 102 for storing temporary data.

MCU 100 includes components 108-116, which can be configured by CPU 102 to operate autonomously. Components 108-116 of MCU 100 can cooperate with each other and CPU 102 to enhance the performance of the MCU 100. I/O system 118 contains I/O pins 122, some of which can be configured by CPU 102 to an input state or an output state. When I/O pins are in the input state, they are often used to read signals generated by devices external to the MCU 100. An I/O pin 122 configured in the input state will be referred to herein as an input pin 122. When in the output state, I/O pins can drive devices external to the MCU 100. An I/O pin 122 configured in the output state will be referred to herein as an output pin 122. CPU 102, flash memory 104, RAM 106, components 108-116, and I/O system 118 are in data communication with each other via communication system 120. Although not shown, communication system 120 may take form in one or more buses, signal lines and other devices that are configured to transmit control values, data, instructions, addresses, event signals, etc.

The components of MCU 100 include one or more comparators 108, each of which can be configured by CPU 102 to generate an event pulse at an output when the comparator determines two input digitals values are equivalent. CPU 102 is built to interpret and process digital data, and accordingly it is not able to do anything with analog signals received from, for example, devices external to MCU 100 such as operational amplifiers. ADCs 110 can convert analog signals into a form that CPU 102 or digital comparators 108 can recognize. An ADC 110 can generate an event pulse upon completion of a conversion. MCU 100 also includes DACs 112, which allow MCU 100 to output analog signals for controlling devices external to the MCU. Like other components such as comparators 108 or ADCs 110, DACs 112 can also generate event signal pulses.

With continuing with reference to FIG. 1, MCU 100 is shown with input pins 122-1 thru 122-10, which are configured to receive event signals, including pulses thereof, from external devices. For example, input pins 122-1 and 122-2 are configured to receive event signals A1 and B1, respectively, and input pins 122-6 thru 122-9, receive event signals C1-C4, respectively. As more will be fully described down below, the event signals received at input pins 122-1 thru 122-10 can be used individually or in combination to control functions (e.g., count, capture, etc.) of T/C units.

Figure 2:
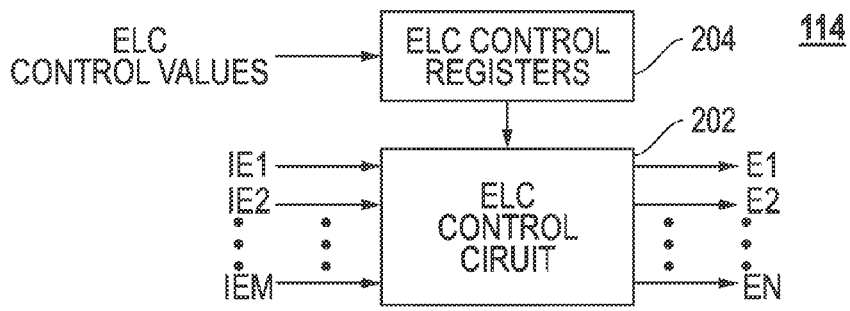
FIG. 2 is a block diagram illustrating an example an event link controller employed in the MCU of FIG. 1.
Figure 3A:
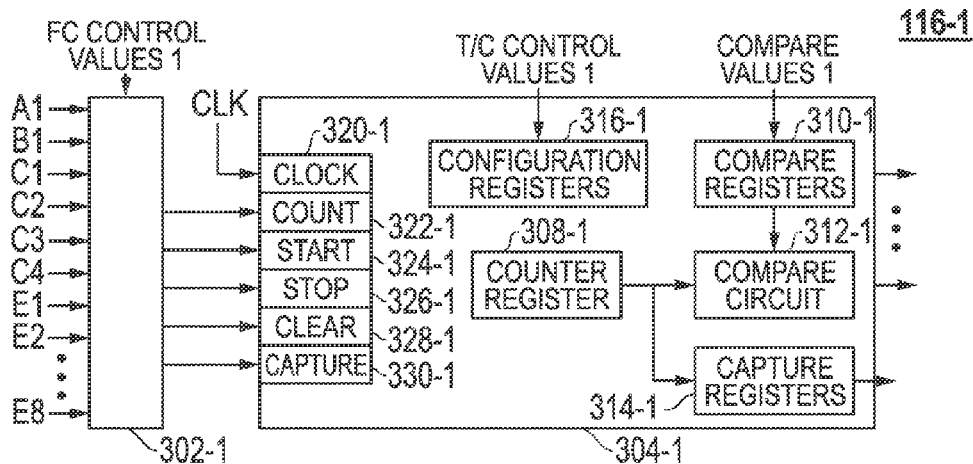
FIGS. 3A-3C are block diagrams illustrating example T/C channels employed in the MCU of FIG. 1.
Figure 3B:
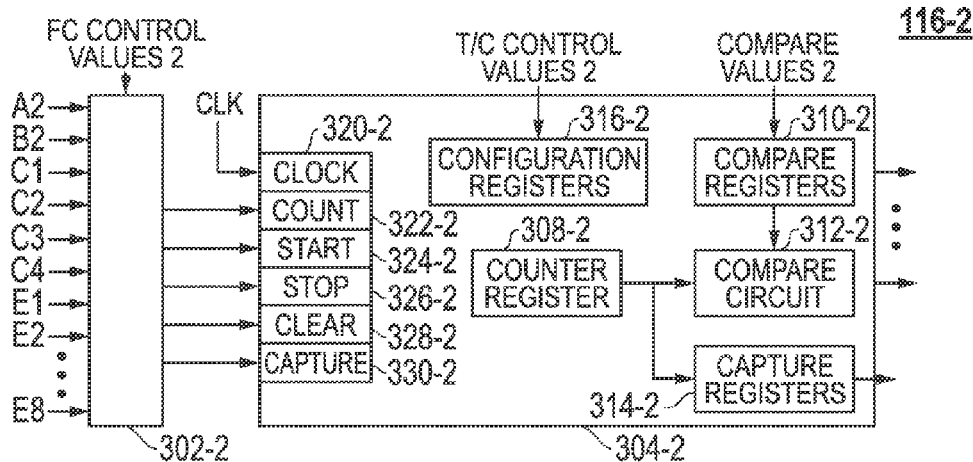
Figure 3C:
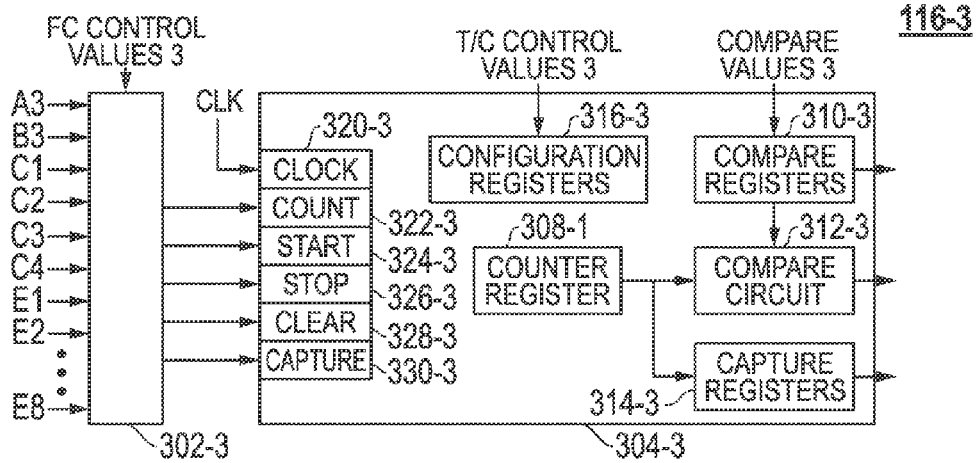

With continuing reference to FIG. 1, MCU 100 includes an event link controller (ELC) 114, one embodiment of which is shown in FIG. 2. ELC 114 receives internally generated event signals IE1-IEM from components such as comparators 108, ADCs 110, T/C channels 116, etc., via communication system 120. ELC 114 can be configured by CPU 102 to select a subset E1-EN of the internally generated event signals IE1-IEM for transmission to one or more components via communication system 120. For purposes of explanation only, M>8 and N=8. ELC 114 selects the subset E1-E8 based on control values written to ELC control registers 204 by CPU 102 via communication system 120. Event signals E1-E8, including event signal pulses thereof, are transmitted to and used by T/C channels 116 as will be more fully described below.

MCU 100 includes T/C channels 116. For ease of illustration, only three T/C channels 116-1 thru 116-3 are shown, it being understood the present inventions could be employed with fewer or more than three T/C channels. Moreover, these T/C units are presumed to be identical in structure except where noted. As will be more fully described below, each T/C channel 116-x includes a T/C unit-x.

With continuing reference to FIGS. 1 and 2, FIGS. 3A-3C illustrate in block diagram form, relevant components of T/C channels 116-1 thru 116-3, respectively. Each of the T/C channels 116-x (where x is 1, 2, or 3) includes a function control (FC) circuit 302-x coupled to receive event signals Ax, Bx, C1-C4, and E1-E8, and FC control values-x from CPU 102. FC circuit 302-x is configured to generate signals that control functions (e.g., start, stop, clear, count, capture, etc.) of T/C unit 304-x. The control signals are generated as a function of one or more of the event signals Ax, Bx, C1-C4, and E1-E8, in accordance with FC control values-x as will be more fully described below.

T/C unit 304-x includes a counter register 308-x that stores a counter value, which can be incremented when T/C unit 304-x receives a pulse of a clock signal at clock port 320-x or a signal pulse from FC circuit 302-x at count port 322-x, depending on how T/C unit-x is configured. The counter register 308-x increments its counter value when a pulse is received from FC circuit 302-x at start port 324-x, and counter register 308-x stops incrementing its counter value when a pulse is received from FC circuit 302-x at stop port 326-x. Counter register 308-x can also clear its counter value to zero or another predetermined value when T/C unit 304-x receives a pulse at clear port 328-x. T/C unit 304-x also includes one or more capture registers 314-x, each of which can store a snapshot copy of the counter value when a pulse is received from FC circuit 302-x at capture port 330-1. Compare registers 310-x receive and store compare values that are generated by CPU 102. Compare circuit 312-x can continuously compare a value of a compare register 310-x with the counter value in counter register 308-x. Although not shown, the T/C unit 304-x may have a compare port, and the compare function could be enabled in response to the compare port receiving a pulse from FC circuit 302-x. T/C unit 304-x can output an event pulse when compare circuit 312-x determines the counter value equates to a compare value stored within a compare register 310-x. Moreover, T/C unit 304-x can output an event pulse when the counter value is captured to a capture register. Other T/C unit-x output event pulses are contemplated.

Each T/C unit 304-x includes configuration registers 316-x for receiving and storing T/C control values-x generated by CPU 102. The T/C control values-x determine operational aspects of T/C unit 304-x. For example, one or more T/C control values-x may determine whether the counter value in register 308-x should increment or decrement with each clock pulse received at port 320-x or each pulse received at count port 322-x. One or more T/C control values may determine whether the counter value should cleared to zero or another predetermined value in response to T/C unit 304-x receiving a pulse from FC circuit 302-x at clear port 328-x. Additional operational aspects of T/C unit 304-x can be determined by T/C control values-x.

Pulses on signals such as C1-C4 can be used individually or collectively to control functions (e.g., clear, capture, etc.) of T/C unit 304-x via FC circuit 302-x. More particularly, FC circuit 302-x can dynamically generate signals for controlling functions of T/C unit 304-x using one or more event signals it receives. For example FC circuit 302-x may be configured by control values generated by CPU 102 to select one and only one input event signal (e.g., E3) to control the capture function of T/C unit 304-x such that a pulse on E3 causes T/C unit 304-x to capture its counter value. At the same time FC circuit 302-x may be configured by CPU 102 to logically combine two or more input event signals to generate a signal, a pulse of which causes T/C unit 304-x to clear its counter value to zero. At a later time, FC circuit 302-x may be reconfigured by CPU 102 to select a different input event signal (e.g., C4) to control the capture function of T/C unit 304-x, or FC circuit 302-x may be reconfigured to logically combine two or more input event signals to generate a signal that controls the capture function of T/C unit 304-x.

CPU 102 could control functions (e.g., start, stop, count, etc.) of T/C unit 304-x. For example, in response to a pulse of an internal or external event signal, CPU 102 can generate a signal that causes the T/C unit-x to clear its counter value to a predetermined value. This type of T/C unit control is adequate for some embedded programs that only require approximate timing control of T/C unit 304-x; however, it can introduce latency errors, which may be problematic for other embedded programs. Control of T/C unit-x via FC circuit 302-x can reduce or otherwise eliminate this latency error. The present invention will be described with reference to control of T/C unit functions via FC circuit 302-x.

Returning to FIGS. 3A-3C, T/C unit 304-x includes a clock port 320-x that is configured to receive a clock signal CLK from, for example, a clock generation circuit provided elsewhere in MCU 100. In some embodiments, configuration registers 316-x may store a value that determines a pre-scalar for the clock signal. This pre-scaler may be used to adjust the speed of clock signal CLK. For purposes of explanation only, it will be presumed the clock signal CLK is not pre-scaled after it is received at port 320-x.

T/C unit 304-x also includes function ports 322-x thru 330-x that enables FC circuit 302-x to control functions of T/C unit 304-x. Function port 322-x is configured to receive a COUNT-x signal from FC circuit 302-x. Depending on the configuration of T/C unit 304-x, the counter value contained within counter register 308-x can increment with each pulse of COUNT-x or CLK. For purposes of explanation only, the present invention will be described with reference to incrementing the counter value with each pulse of COUNT-x. Counter register 308-x will not increment its counter value unless the counter register is started. Counter register 308-x can be started when function port 324-x receives a pulse of the START-x signal from FC circuit 302-x. Further, counter register 308-x will continue incrementing its counter value until it is stopped. Counter register 308-x can be stopped when function port 326-x receives a pulse of the STOP-x signal from FC circuit 302-x. Function port 328-x is configured to receive a CLEAR-x signal from FC circuit 302, and in response to a pulse of the CLEAR-x signal, the counter value contained within counter register 308 can reset to 0 or another predetermined value. T/C unit 304-x also includes a capture function port 330-x which is configured to receive a CAPTURE-x signal from FC circuit 302. In response to receiving a pulse of CAPTURE-x, one of the capture registers 314-x can take a snapshot of the counter value contained within counter register 308-x. Although not shown, additional function control ports are contemplated.

T/C unit 304-x can generate one or more output event signals. For example, T/C unit 304-x can generate a pulse on one event signal that indicates equality has been determined between a compare value in a register 310-x and the counter value in counter register 308-x. T/C unit 304-x can generate a separate pulse on another output event signal when a snapshot of the counter value has been captured in one of the registers 314-x. Additional output event signals are contemplated. Ultimately, these event signals generated by T/C unit 304-x can be distributed to other components of MCU 100, including ELC 114 or CPU 102, via communication system 120.

As noted above, T/C units 304-1 thru 304-3 are identical in structure. It is further noted that the configuration registers 316-x and compare registers 310-x in each of these T/C units can receive distinct T/C control values-x and distinct compare values-x generated by CPU 102. Lastly, it is noted that each of the FC circuits 302-1 thru 302-3 receive the same internally generated event signals E1-E8 from ELC 114, and externally generated event signals C1-C4 from input pins 122-7 thru 122-10. However, the event signal inputs to FC circuits 302-1 thru 302-3 are not identical in the embodiments shown. For example, FC 302-1 receives externally generated event signals A1 and B1, while FC circuit 302-2 receives externally generated event signals A2 and B2, and FC circuit 302-3 receives externally generated event signals A3 and B3.

FC circuit 302-x produces signals (i.e., START-x, STOP-x, CLEAR-x, COUNT-x, CAPTURE-x, etc.) for controlling respective functions (start, stop, clear, count, capture, etc.) of T/C unit 304-x. Each of the control signals are generated by FC circuit 302-x as a function of one or more of event signals Ax, Bx, C1-C4, and E1-E8, in accordance with one or more FC control values-x generated by CPU 102. For example, FC circuit 302-1 can generate CAPTURE-1 as a function of one or more of the input event signals A1, B1, C1-C4, and E1-E8. With continuing reference to FIGS. 3A-3C, FIG. 4 illustrates relevant components of an example FC circuit 302-x that can be employed in T/C units 116-x. More particularly, the FC circuit 302-x shown in FIG. 4 includes control signal circuits 402-x-y, each of which operates to generate a signal for controlling a respective function of corresponding T/C unit 304-x. Each of the control signal circuits 402-x-y receive internally generated event signals E1-E8 from ELC 114 and externally generated event signals C1-C4. Lastly, each of the control signal circuits 402-x-y receive externally generated event signals Ax and Bx. Each of the control signal circuits 402-x-y generates its signal according to the one or more FC control values-x-y generated by and received from CPU 102 via the communication system 120. It is noted that CPU 102 generates FC control values-x-y as the function of the embedded program it is executing. The FC control values-x-y provided to control signal circuits 402-x-y, can change, which in turn can change the generated control signal.

Figure 4:
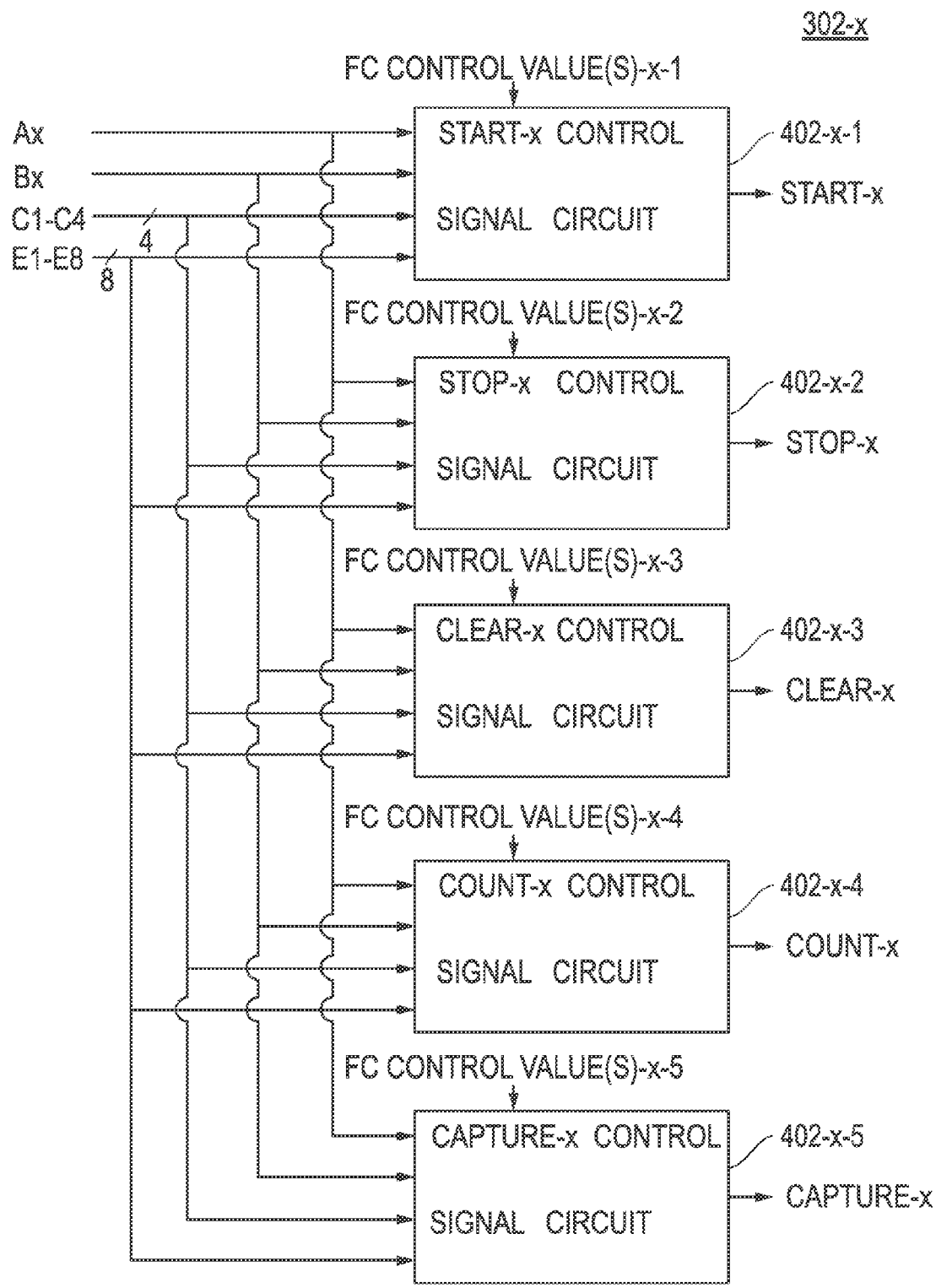
FIG. 4 is a block diagram of an example function controller circuit that could be employed in T/C channels of FIGS. 3A-3B.
Figure 5A:
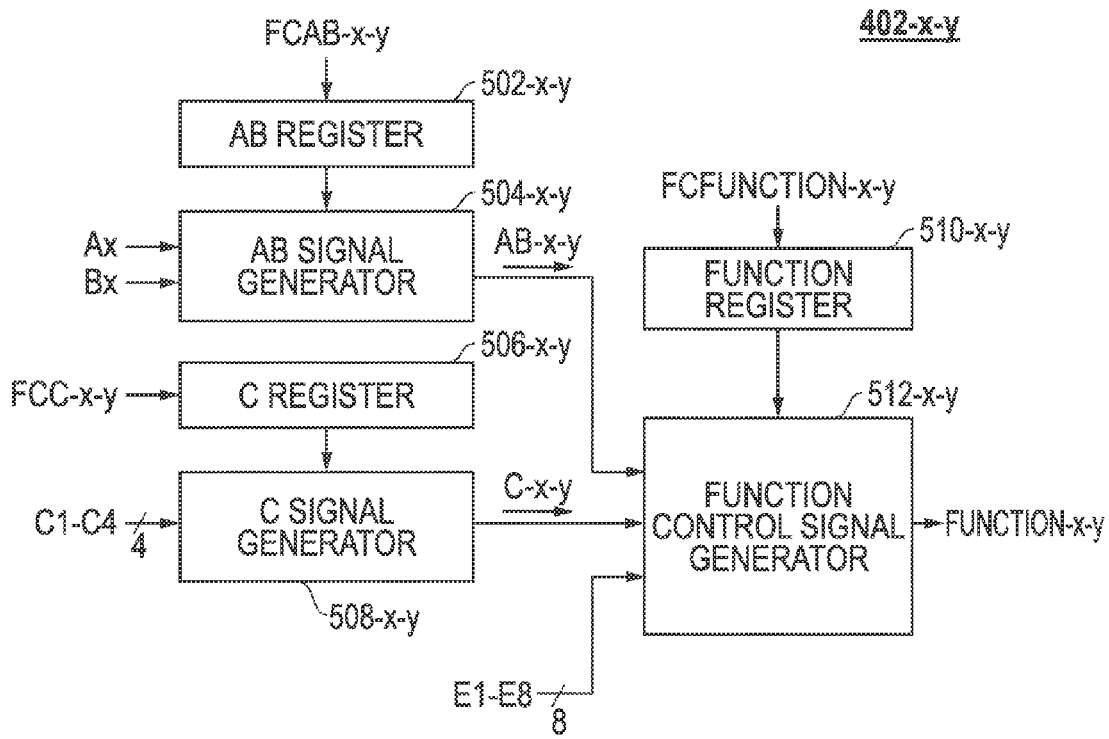
FIGS. 5A and 5B are block diagrams illustrating alternative, example control signal circuits that could be employed in the FC circuit of FIG. 4.

FIG. 5A illustrates relevant components of an example control signal circuit 402-x-y that can be employed in the FC circuit 302-x shown in FIG. 4. Control signal circuit 402-x-y shown in FIG. 5A includes an AB register 502-x-y that is configured to receive an FC control value FCAB-x-y from CPU 102. AB signal generator 504-x-y receives externally generated event signals Ax and Bx as inputs. AB signal generator 504-x-y generates a signal AB-x-y as a function of Ax and Bx. AB signal generator 504-x-y will generate a pulse on signal AB-x-y when one of the following events occurs:

1. Ax transitions to high while Bx is low.
2. Ax transitions to high while Bx is high
3. Ax transitions to low while Bx is low
4. Ax transitions to low while Bx is high
5. Bx transitions to high while Ax is low
6. Bx transitions to high wile Ax is high
7. Bx transitions to low while Ax is low
8. Bx transitions to low while Ax is high FCAB-x-y, which is stored within register 502-x-y, determines which of the foregoing events will cause the pulse on signal AB-x-y.

C register 506-x-y receives FC control value FCC-x-y generated by CPU 102. C signal generator 508-x-y receives externally generated event signals C1-C4 as inputs. C signal generator 508-x-y generates a signal C-x-y as a function of one or more of C1-C4. C signal generator 508-x-y, in one embodiment, will generate a pulse on C-x-y when one of the following occurs:

1. C1 transitions to high
2. C1 transitions to low
3. C2 transitions to high
4. C2 transitions to low
5. C3 transitions to high
6. C3 transitions to low
7. C4 transitions to high
8. C4 transitions to low FCC-x-y, which is stored within register 506-x-y, determines which of the foregoing events will cause the pulse on the C-x-y signal.

Control signal generator 512-x-y receives at least one FC control value FCFunction-x-y generated by CPU 102, which is stored in function register 510-x-y. Control signal generator 512-x-y generates FUNCTION-x-y as a function of one or more of the input signals AB-x-y, C-x-y, and E1-E8. FCFunction-x-y stored within register 510-x-y determines which of signals AB-x-y, C-x-y, and E1-E8 are selected by control signal generator 512-x-y for use in generating FUNCTION-x-y. Moreover, FCFunction-x-y may define how the selected one or more input signals are combined to generate FUNCTION-x-y. For example, one value of FCFunction-x-y may result in FUNCTION-x-y being generated by logically ORing AB-x-y with E2, the result of which is logically ANDed with E4 and C-x-y; while another value of FCFunction-x-y may result in FUNCTION-x-y being generated by logically ANDing E1 and E2, the result of which is logically ORed with AB-x-y; while yet another value of FCFunction-x-y may result in FUNCTION-x-y being equal to AB-x-y. Accordingly, FUNCTION-x-y varies with FCFunction-x-y.

Figure 5B:
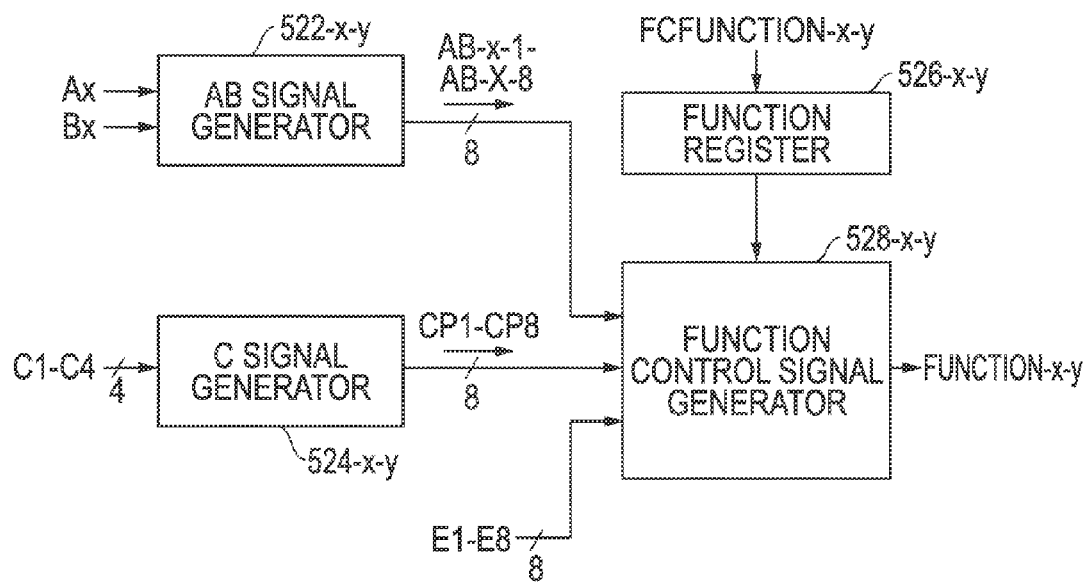

FIG. 5B illustrates relevant components of an alternative control signal circuit 402-x-y that can be employed in the FC circuit 302-x shown in FIG. 4. In this embodiment, control signal circuit 402-x-y includes AB generator 522-x-y, which receives externally generated event signals Ax and Bx as inputs. AB generator 522-x-y concurrently generates eight signals ABx-1 thru ABx-8 as a function of Ax and Bx. The pulses of the eight signals are generated as follows:

1. ABx-1 pulses when Ax transitions to high while Bx is low.
2. ABx-2 pulses when Ax transitions to high while Bx is high
3. ABx-3 pulses when Ax transitions to low while Bx is low
4. ABx-4 pulses when Ax transitions to low while Bx is high
5. ABx-5 pulses when Bx transitions to high while Ax is low
6. ABx-6 pulses when Bx transitions to high wile Ax is high
7. ABx-7 pulses when Bx transitions to low while Ax is low
8. ABx-8 pulses when Bx transitions to low while Ax is high C signal generator 524-x-y receives externally generated event signals C1-C4. C signal generator 524-x-y concurrently generates eight signals CP-1 thru CP-8 as a function of C1-C4. The pulses of the eight CP signals are generated as follows:

1. CP-1 pulses when C1 transitions to high
2. CP-2 pulses when C1 transitions to low
3. CP-3 pulses when C2 transitions to high
4. CP-4 pulses when C2 transitions to low
5. CP-5 pulses when C3 transitions to high
6. CP-6 pulses when C3 transitions to low
7. CP-7 pulses when C4 transitions to high
8. CP-8 pulses when C4 transitions to low AB-1 thru AB-8, CP-1 thru CP-8, and E1-E8 are provided as inputs to function control signal generator 528-x-y. Function register 526-x-y receives and stores at least one FC control value FCFunction-x-y generated by CPU 102. It is noted that distinct FC control values are employed in alternative embodiments shown in FIGS. 5A and 5B. Control signal generator 528-x-y generates FUNCTION-x-y as a function of one or more of the input signals AB-1 thru AB-8, CP-1 thru CP-8, and E1-E8. The FC control value stored within register 526-x-y determines which of input signals are selected by control signal generator 528-x-y for use in generating FUNCTION-x-y. Moreover, the FC control value stored in register 526-x-y define how the selected one or more input signals are combined by generator 528-x-y to generate FUNCTION-x-y.

Figure 6A:
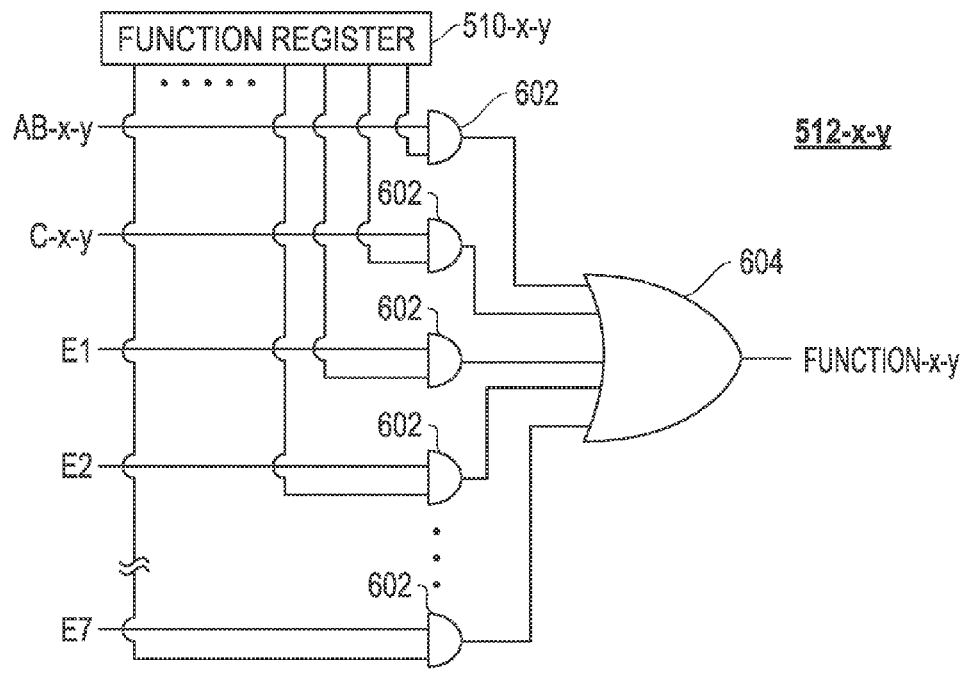
FIGS. 6A, 6B and 7 are block diagrams illustrating alternative, example alternative function control signal generators that could be employed in the control signal circuits of FIG. 5A or 5B.
Figure 6B:
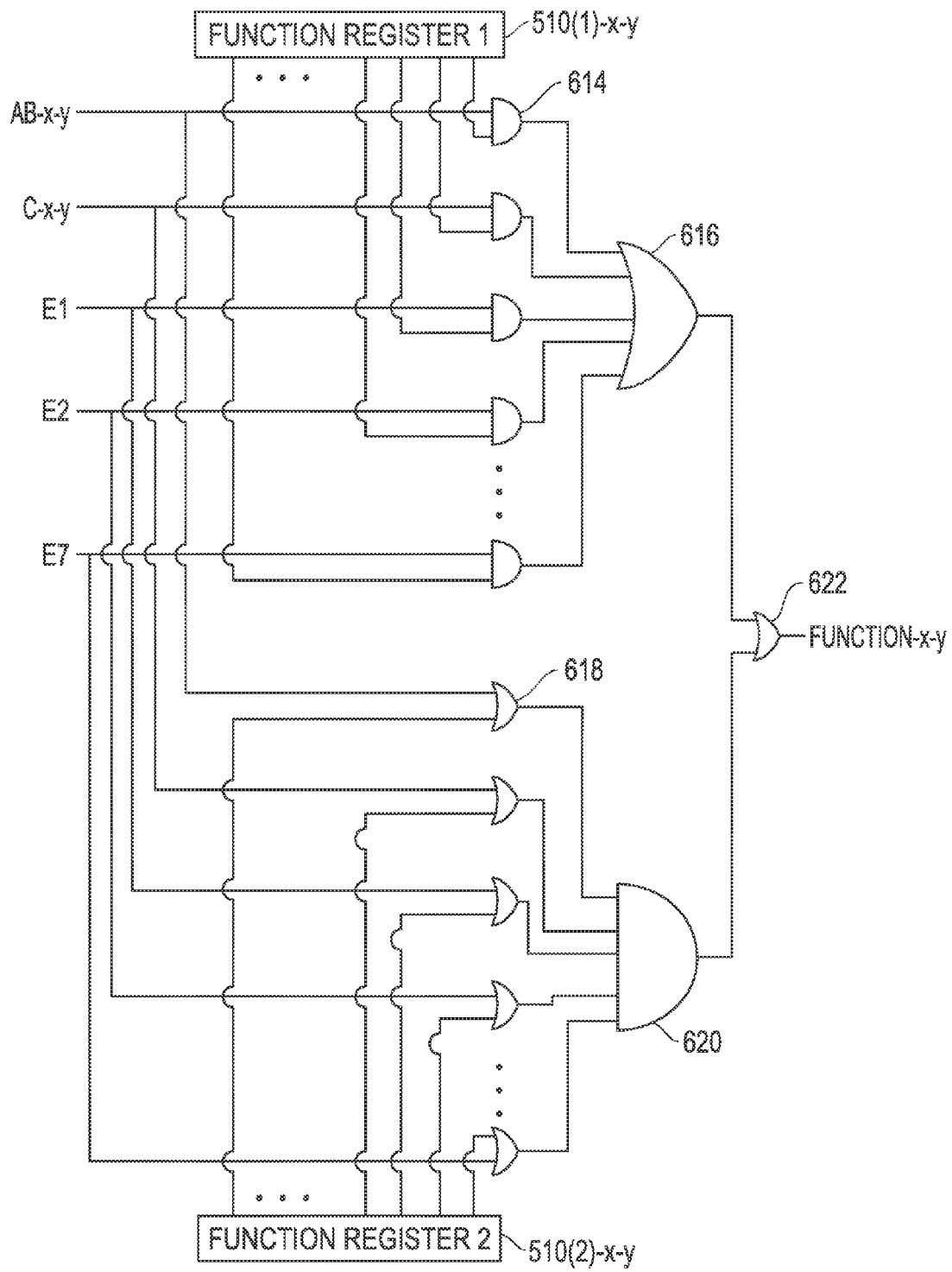

FIGS. 6A and 6B illustrates alternative embodiments of the function control signal generator 512-x-y shown in FIG. 5A. Function control signal generator 512-x-y in the embodiment shown in FIG. 6A includes AND gates 602, the outputs of which are coupled to inputs of OR gate 604. One input of each of the AND gates 602 is coupled to receive one of AB-x-y, C-x-y, and E1-E8 as shown. The other input of AND gates 602 is configured to receive a respective bit of FCFunction-x-y stored within function register 510-x-y. In this configuration, FCFunction-x-y determines which of the input signals AB-x-y, C-x-y, and E-1 thru E-8 are passed to the inputs of OR gate 604. One of ordinary skilled in the art understands that one or more of AB-x-y, C-x-y, and E-1 thru E-8 can be passed by AND gates 602 and logically ORed together to generate FUNCTION-x-y.

FIG. 6B illustrates an alternative embodiment of the function control generator 512-x-y shown within FIG. 5A. In this embodiment, two function registers store separate FC control values generated by CPU 102. Specifically function registers 510(1)-x-y and 510(2)-x-y store FCFunction(1)- x-y and FCFunction(2)-x-y. Function signal generator 512 in FIG. 6A includes three levels of logic gates. The bits of the FCFunction(1)-x-y determine which of the input signals AB-x-y, C-x-y, and E-1 thru E-8 are passed by AND gates 614 to OR gate 616. Likewise, the bits of FCFunction(2)-x-y determine which of the input signals AB-x-y, C-x-y, and E-1 thru E-8 pass through OR gates 618 to AND gate 620. The outputs of OR gate 616 and AND gate 620 are provided to OR gate 622, which in turn generates FUNCTION-x-y.

Figure 7:
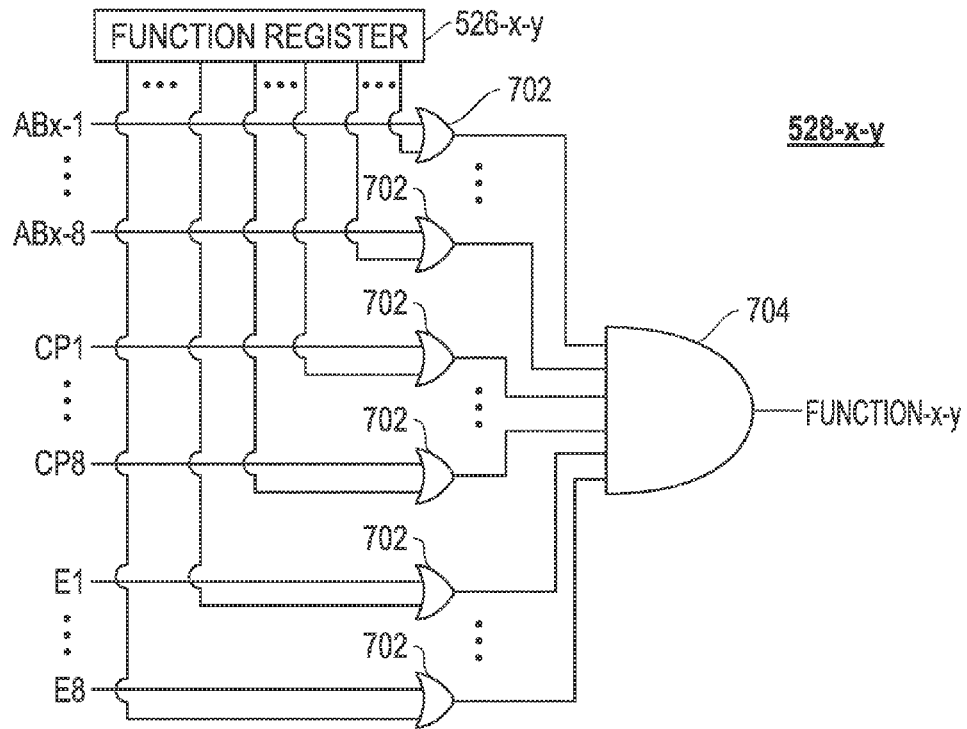

FIG. 7 illustrates one embodiment of the function signal generator 528-x-y that can be employed within the embodiment of FIG. 5B. Function control signal generator 528-x-y includes OR gates 702, the outputs of which are coupled to inputs of AND gate 704. One input of each of the OR gates 702 is coupled to receive a respective one of the input signals AB-x-1 thru AB-x-8, CP-1 thru CP-8, and E-1 thru E-8 as shown. The other input of OR gates 702 is configured to receive a bit of FCFunction-x-y stored within function register 526. In this configuration, FCFunction-x-y determines which of the input signals AB-x-1 thru AB-x-8, CP-1 thru CP-8, and E-1 thru E-8 are passed to the inputs of AND gate 704. One of ordinary skilled in the art understands that one or more of AB-x-1 thru AB-x-8, CP-1 thru CP-8, and E-1 thru E-8 can be passed by OR gate 702s and logically ANDed together to generate FUNCTION-x-y.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A microcontroller comprising:
   a central processing unit (CPU);
   a memory for storing instructions executable by the CPU;
   a first timer/counter (T/C) channel coupled to receive control values generated by the CPU in response to executing the instructions, and M event signals, wherein M is an integer greater than 1;
   wherein the first T/C channel is configured to select two or more of the M event signals based on the one or more of the control values;
   wherein the first T/C channel is configured to internally generate a first control signal as a function of the selected two or more of the M event signals;
   wherein a first function of the first T/C channel can be controlled by the first control signal.

2. The microcontroller of claim 1 wherein the first T/C channel comprises a first T/C unit and a first function control circuit, wherein the first function control circuit is configured to receive the M event signals, wherein the first function control circuit is configurable by the CPU to generate N control signals, including the first control signal, for controlling N functions, respectively, including the first function, of the T/C unit.

3. The microcontroller of claim 2 wherein the first T/C unit comprises a first counter register configured to store a first counter value, wherein the first counter value can be incremented or decremented after the first T/C unit is started, wherein the first T/C unit is started in response to a transition of the first control signal.

4. The microcontroller of claim 3 wherein the first counter value will not increment or decrement after the first T/C unit is stopped, wherein the first T/C unit is stopped in response to a transition of a second of the N control signals.

5. The microcontroller of claim 4 wherein the first counter value can be reset to a predetermined value in response to a transition of a third of the N control signals.

6. The microcontroller of claim 5 wherein the first counter value can be copied to a capture register in response to a transition of a fourth of the N control signals.

7. The microcontroller of claim 6 wherein the first counter value can be incremented or decremented by one in response to a transition of a fifth of the N control signals.

8. The microcontroller of claim 1 further comprising:
   a second timer/counter (T/C) channel coupled to receive second control values generated by the CPU, and the M event signals;
   wherein the second T/C channel is configured to select one or more of the M event signals based on the one or more of the second control values;
   wherein the second T/C channel is configured to internally generate a first control signal as a function of the one or more of the M event signals selected by the second T/C unit;
   wherein a first function of the second T/C channel is controlled by the first control signal generated by the second T/C channel.

9. A method comprising:
   a CPU generating first control values;
   a first T/C channel selecting two or more M event signals based on one or more of the first control values;
   the first T/C channel internally generating a first control signal for controlling a first function of the first T/C channel;
   wherein the first control signal is generated as a function of the selected two or more of the M event signals.

10. The method of claim 9 wherein the first T/C channel comprises a first T/C unit and a first function control circuit, wherein the first function control circuit receives the M event signals, wherein the first function control generates N control signals, including the first control signal, for controlling N functions, respectively, including the first function, of the T/C unit.

11. The method of claim 10 wherein the first T/C unit comprises a first counter register that stores a first counter value, wherein the first counter counter value can be incremented or decremented after the first T/C unit is started, wherein the first T/C unit is started in response to a transition of the first control signal.

12. The method of claim 11 wherein the first counter value will not increment or decrement after the first T/C unit is stopped, wherein the first T/C unit is stopped in response to a transition of a second of the N control signals.

13. The method of claim 12 wherein the first counter value is reset to a predetermined value in response to a transition of a third of the N control signals.

14. The method of claim 13 wherein the first counter value is copied to a capture register in response to a transition of a fourth of the N control signals.

15. The method of claim 14 wherein the first counter value is incremented or decremented by one in response to a transition of a fifth of the N control signals.

16. The method of claim 9 further comprising:
   a second timer/counter (T/C) channel receiving second control values generated by the CPU, and the M event signals;
   the second T/C channel selecting one or more of the M event signals based on the one or more of the second control values;

the second T/C channel internally generating a first control signal as a function of the one or more of the M event signals selected by the second T/C channel;

controlling a first function of the second T/C channel using the first control signal generated by the second T/C channel.

17. A method comprising:

a computer system transmitting instructions to a microcontroller for storage therein, wherein the microcontroller can implement another method in response to executing the instructions, the another method comprising:

a CPU in the microcontroller generating one or more first control values;

the CPU transmitting the one or more first control values to a first T/C channel in the microcontroller for storage therein;

wherein the first T/C channel is configured to select two or more of M event signals in response to receiving the one or more first control values;

wherein the first T/C channel is configured to internally generate a first control signal as a function of the two or more of the M event signals;

wherein a first function of the first T/C channel can be controlled by the first control signal.

18. The method of claim 17:

wherein the first T/C channel is configured to select a subset of M event signals in response to receiving the one or more first control values;

wherein the first T/C channel is configured to generate a second control signal as a function of the subset;

wherein a second function of the first T/C channel can be controlled by the second control signal.

19. The method of claim 18 wherein the another method further comprises:

the CPU generating one or more second control values;

transmit the one or more second control values to a second T/C channel in the microcontroller for storage therein;

wherein the second T/C channel is configured to select another subset of M event signals in response to receiving the one or more second control values;

wherein the second T/C channel is configured to generate a third control signal as a function of the another subset;

wherein a first function of the second T/C channel can be controlled by the third control signal.

20. The method of claim 17 wherein the first function is one of incrementing a counter value in a register of the first T/C channel, decrementing the counter value, clearing the counter value, capturing the counter value, enabling the first T/C so that the counter value can be incremented or decremented, or disabling the first T/C counter so that the counter cannot be incremented or decremented.

* * * * *